2 Sheets. Sheet 1.

J. P. Flanders,

Dovetailing Machine.

No. 109,194. Patented Nov. 15, 1870.

Witnesses
W. H. Chandler
W. R. Singleton

Inventor
J. P. Flanders

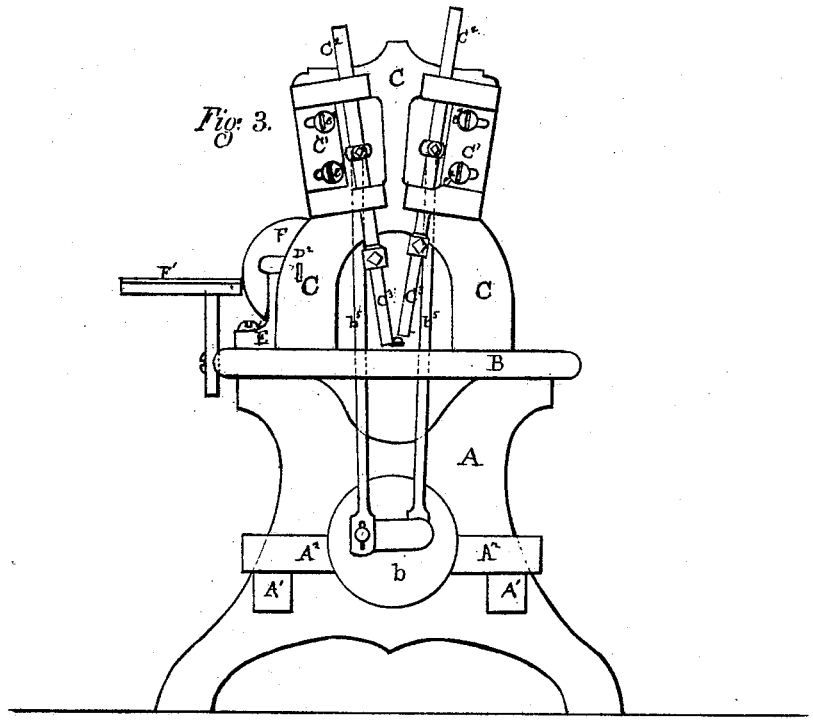

United States Patent Office.

JOHN P. FLANDERS, OF VERGENNES, VERMONT.

Letters Patent No. 109,194, dated November 15, 1870.

IMPROVEMENT IN DOVETAILING-MACHINES.

The Schedule referred to in these Letters Patent and making part of the same.

*To all whom it may concern:*

Be it known that I, JOHN P. FLANDERS, of Vergennes, in the county of Addison and State of Vermont, have invented a new and useful Machine for Cutting Dovetails; and I hereby declare the following to be a full, clear, and exact description thereof, reference being had to the accompanying drawing, in which—

Figure 1:
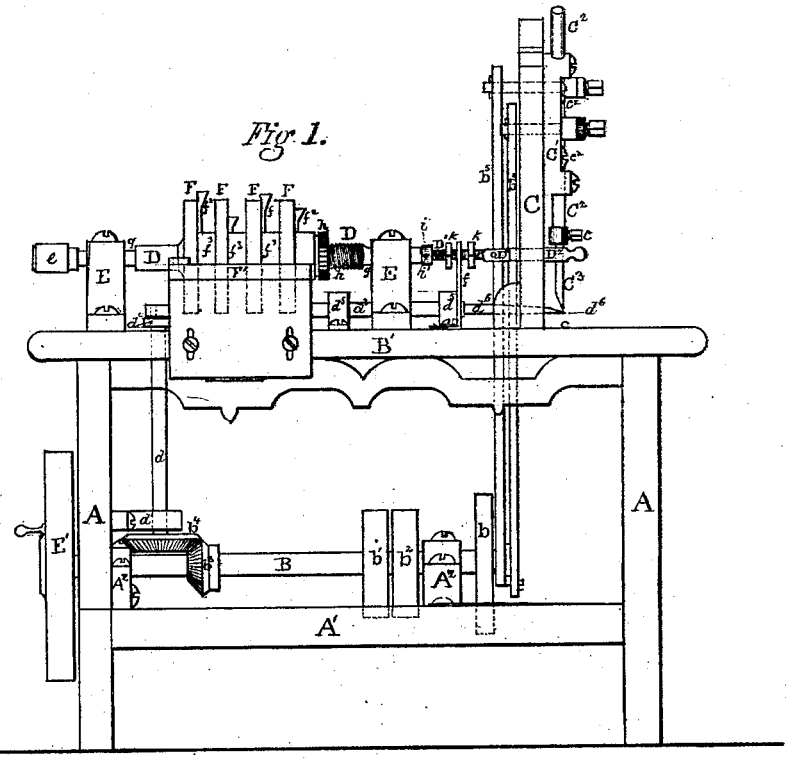
Figure 2:
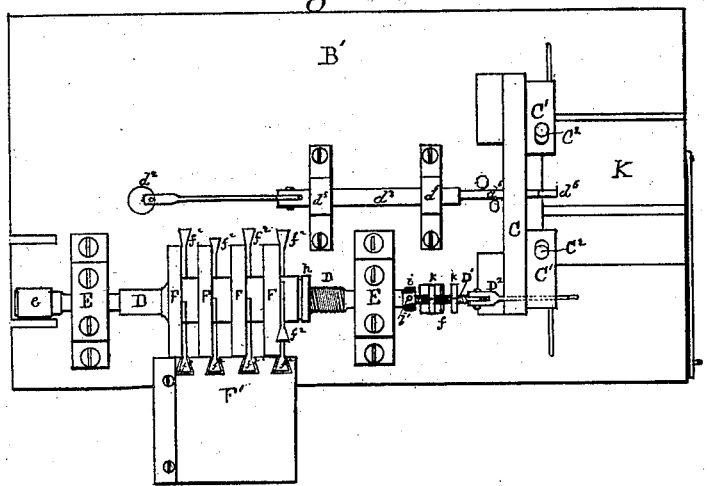

Plate 1, figure 1 is a side view;
Figure 2 is a top view; and
Plate 2, figure 3 is an end view of the machine.

Same letters refer to like parts in all the figures.

The nature of my invention relates:

First, to the manner of arranging the cutting-chisels, which move vertically in adjustable frames, so that any angle may be cut, from a perpendicular or square cut to the utmost limit required for dovetailed joints.

Second, in the manner of moving the horizontal shaft of the rotary cutters to give a reciprocating movement, so that the width of the dovetail mortises may be adjusted by the operator.

Third, in the combination of the different parts of the machine, as hereinafter described.

In the drawing—

A is the frame of the table.

$A^1$, the cross-rails, upon which are placed the plummer-blocks $A^2$, that sustain the main driving-shaft B, on which shaft are the crank-wheel $b$, pulley $b^1$, and loose pulley $b^2$, beveled gear-wheels $b^3$ and $b^4$.

B' is the table-top, upon which is placed the standard arched frame C, on which are fastened the chisel-frames $C^1$ $C^1$, carrying the chisel-shanks $C^2$ $C^2$, into which are fixed, by set-screws $c$ $c$, the chisels $C^3$ $C^3$.

These frames $C^1$ $C^1$ are made adjustable by means of screws $c^2$ $c^2$, and slots for their adjustment.

The chisel-shanks or rods are attached to pitman-bars $b^5$ $b^5$, which are connected to, and operated by, crank-wheel $b$ on the main shaft.

On the table is also a horizontal shank, $d^3$, worked by a crank-wheel, $d^2$, on the end of a vertical shaft, $d$, which is driven by the beveled gear-wheel $b^4$ at its lower end, meshing with gear-wheel $b^3$ on the main shaft B.

This shaft $d$ is supported in a bracket, $d^1$, fastened to the end frame.

The horizontal shank $d^3$ works in guides $d^5$ $d^5$ fastened to the table-top.

In the shank is the chisel $d^6$, working in connection with the vertical chisels $C^3$ $C^3$, receiving its reciprocating motion from the main driving shaft B by means of beveled gears $b^3$ and $b^4$.

On the table is placed a horizontal shaft, D, supported in plummer-blocks E E.

At one end of shaft D is a pulley, $e$, driven by a belt from the large pulley E' on the end of the shaft B.

At the other end of shaft D is a socket-joint, $i$, in which is inserted a smaller shaft, $D^1$, which is held in said socket by a pin, $i'$, inserted into a neck of the shaft $D^1$, through the socket on D, in the usual way.

Shaft $D^1$ has a screw-thread cut upon it nearly from end to end, and passes through a standard, $f$, secured rigidly to the table.

On either side of said standard is a nut, $k$, fitted to the shaft $D^1$, which nuts, by being adjusted, serve as stops to the horizontal movements of the shaft.

At the outer end of the shaft $D^1$ is jointed, by tenon and mortise, a short shaft or sliding bar, $D^2$, which is made flat vertically, and passes through the standard C, having at its outer extremity a conveniently-shaped handle, and a notch or notches on the lower edge, which are fitted to a plate on the standard to secure the shaft D in any desired position.

The bearings of shaft D in the plummer-blocks are all reduced, and have shoulders to provide for the lateral reciprocating movement, as seen at $g$ $g$.

On shaft D are placed any convenient number of rotary disks, F, having dovetail or other-shaped cutters $f^2$, separated by collars $f^3$, and fastened by a screw-nut, $h$, fitted to the thread cut upon the shaft, as seen at $h$ $h$.

Attached to the table, on the front edge, is a feed-board, F', fastened to the edge by screws having slots, so that the feed-board may be adjusted to any convenient position to suit the work to be done. Gauges on the board are placed as usual, to guide the work.

On the table, under the chisels, and outside of the standard C, is another feed-board, K, with its guides, and a spacing-rod for adjusting the board for the dovetails.

Operation.

Power may be applied, in any of the usual forms, either at the end of the shaft or to the pulley $b^1$. Motion then will be given to the chisels' shanks $C^2$ $C^2$ by the pitman-bars $b^5$ $b^5$, and, at the same time the horizontal chisel-shank $d^3$ will be put in motion by the vertical shaft $d$ and its crank-wheel $d^2$.

The band from pulley E', connecting with pulley $e$ on the end of shaft D, gives motion to the revolving cutters F.

The shaft D, being jointed by a socket to a smaller shaft $D^1$, revolves freely without revolving $D^1$, which, being attached to the bar $D^2$, is prevented from turning by the slot in the standard C.

Claims.

1. The chisel-frames $C^1 C^1$, made adjustable on the arched standard C, for the purpose of adapting the chisels to any desired angle, in the manner shown and described.

2. The horizontal shaft D, with its connections $D^1$, provided with screw-thread and nuts $k\ k$, and standard $f$, jointed bar $D^2$, and arched standard C, all constructed and combined substantially as and for the purpose described.

3. The combination of chisels $C^2 C^2$ and $C^3$ with adjustable frames $C^1 C^1$, horizontal shaft D, with its disks and cutters F and $f^2$, shaft $D^1$, and its connections for moving it reciprocally, all substantially as and for the purpose described.

J. P. FLANDERS.

Witnesses:
M. T. E. CHANDLER,
W. R. SINGLETON.